United States Patent
Schmidt

(10) Patent No.: US 9,207,464 B2
(45) Date of Patent: Dec. 8, 2015

(54) SPECTACLES WITH EXCHANGEABLE LENS

(71) Applicant: UVEX SPORTS GmbH & Co. KG, Fürth (DE)

(72) Inventor: Bernhard Schmidt, Zirndorf (DE)

(73) Assignee: UVEX SPORTS GMBH & CO. KG, Fürth (DE)

( * ) Notice: Subject to any disclaimer, the term of this patent is extended or adjusted under 35 U.S.C. 154(b) by 0 days.

(21) Appl. No.: 14/178,537

(22) Filed: Feb. 12, 2014

(65) Prior Publication Data
US 2014/0226121 A1   Aug. 14, 2014

(30) Foreign Application Priority Data
Feb. 13, 2013   (DE) .......................... 10 2013 202 336

(51) Int. Cl.
G02C 1/00 (2006.01)
G02C 1/06 (2006.01)

(52) U.S. Cl.
CPC .............. *G02C 1/06* (2013.01); *G02C 2200/02* (2013.01); *G02C 2200/08* (2013.01)

(58) Field of Classification Search
CPC ...... G02C 1/06; G02C 5/008; G02C 2200/02; G02C 2200/06; G02C 2200/08
USPC .............................. 351/83, 86, 140, 154, 178
See application file for complete search history.

(56) References Cited

U.S. PATENT DOCUMENTS

| | | | |
|---|---|---|---|
| 5,035,498 A | 7/1991 | Bolle Robert | |
| 5,971,536 A | 10/1999 | Chiu | |
| 6,224,209 B1 | 5/2001 | Chen | |
| 2009/0135370 A1 | 5/2009 | Xiao | |
| 2013/0278884 A1 | 10/2013 | Fuchs et al. | |
| 2014/0098337 A1* | 4/2014 | Chen | 351/153 |
| 2014/0300854 A1* | 10/2014 | Fox | 351/47 |

FOREIGN PATENT DOCUMENTS

| | | |
|---|---|---|
| DE | 202 12 399 U1 | 10/2002 |
| JP | H10-133 151 A | 5/1998 |
| WO | 03040809 A2 | 5/2009 |
| WO | 2012099631 A1 | 7/2012 |
| WO | 2012100276 A2 | 8/2012 |

OTHER PUBLICATIONS

European search report dated May 20, 2014. Application No. 14 153 970.0.

* cited by examiner

*Primary Examiner* — Huy K Mai
(74) *Attorney, Agent, or Firm* — Browdy and Neimark, PLLC

(57) ABSTRACT

The invention relates to a pair of spectacles, in particular sports spectacles, comprising a spectacle frame, at least one spectacle lens which is detachably locked by the spectacle frame and a locking means for securing the spectacle lens to the spectacle frame. The locking means is displaceable relative of the spectacle frame between a spectacle lens locking position and a spectacle lens unlocking position, wherein the locking means interacts with the spectacle lens in the spectacle lens locking position for the spectacle lens to be secured to the spectacle frame. In the spectacle lens unlocking position, the locking means unlocks the spectacle lens in such a way that the spectacle lens is removable from the spectacle frame. The gist of the invention is a locking counter-means interacting with the locking means, the locking counter means being arranged on the spectacle frame. Each of the locking means and the locking counter-means comprises a magnetic element, wherein the first magnetic element of the locking means interacts with the second magnetic element of the locking counter-means.

14 Claims, 3 Drawing Sheets

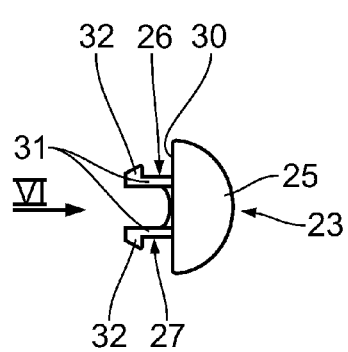
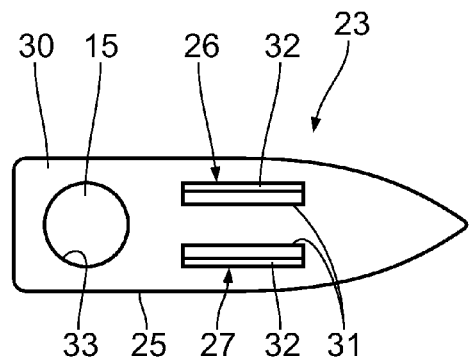
Fig. 5  Fig. 6
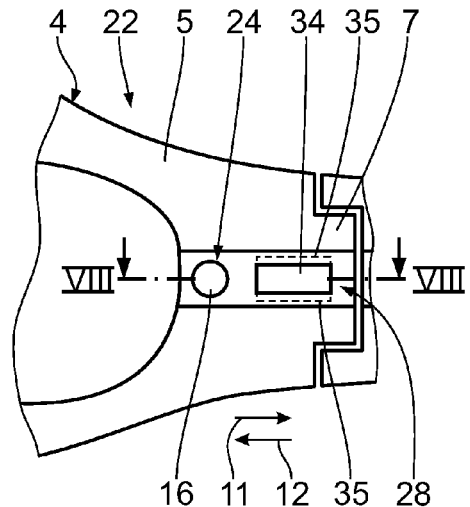
Fig. 7
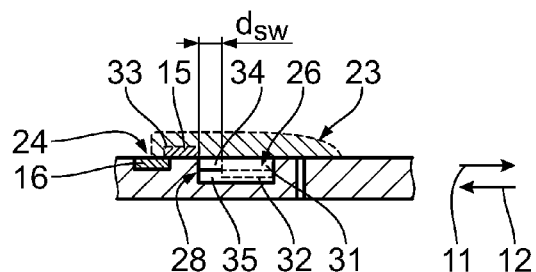
Fig. 8

SPECTACLES WITH EXCHANGEABLE LENS

CROSS-REFERENCES TO RELATED APPLICATIONS

This application claims the priority of Patent Application Serial No. DE 10 2013 202 336.7, filed on 13 Feb. 2013, pursuant to 35 U.S.C 119(a)-(d), the content of which is incorporated herein by reference in its entirety as if fully set forth herein.

FIELD OF THE INVENTION

The invention relates to a pair of spectacles, in particular sports spectacles, comprising an exchangeable spectacle lens.

BACKGROUND OF THE INVENTION

Spectacles of this type are generally known. The spectacle lenses of known spectacles are exchangeable, for example in order to replace damaged lenses or to adapt a tinting of the lenses to ambient conditions or to the personal taste of a wearer. In this respect, DE 202 12 399 U1 discloses a pair of spectacles comprising a spectacle frame and two spectacle lenses which are retained in the spectacle frame. A locking element provides a positive fit between in each case one spectacle lens and the frame part. U.S. Pat. No. 5,971,536 A also discloses a pair of spectacles comprising exchangeable spectacle lenses which are removable and mountable without requiring any tooling. To this end, locking elements are provided which provide a positive fit between the spectacle lenses and the spectacle frame in a locking position. Moreover, the patent specifications WO 2012/100 276 A2, JP H10-133151 A and U.S. Pat. No. 6,224,209 B1 each disclose a pair of spectacles comprising a spectacle frame, detachably mounted spectacle lenses and locking means for retaining the spectacle lenses which are displaceable between a locking position and an unlocking position. The prior art spectacle lens locking elements have a very complex design. Mounting and demounting spectacle lens locking elements of prior art spectacles requires a great amount of effort and dexterity which is in particular due to the large number of small components such as biasing elements in the form of springs, locking bodies or guide elements. Moreover, when the lenses are exchanged on a regular basis, this may cause the spectacle lens locking elements to wear out so that they need to be replaced.

SUMMARY OF THE INVENTION

An object of the present invention is to provide a pair of spectacles of the type named at the outset that provides a simpler way of exchanging spectacle lenses.

This object is achieved by a pair of spectacles, in particular sports spectacles, comprising a spectacle frame; at least one spectacle lens which is detachably locked by the spectacle frame; a locking means for securing the spectacle lens to the spectacle frame, wherein the locking means is displaceable relative of the spectacle frame between a spectacle lens locking position and a spectacle lens unlocking position; interacts with the spectacle lens in the spectacle lens locking position and retains the spectacle lens in the spectacle frame; and unlocks the spectacle lens in the spectacle lens unlocking position in such a way that the spectacle lens is removable from the spectacle frame; and a locking counter-means interacting with the locking means, wherein the locking counter means is arranged on the spectacle frame, wherein each of the locking means and the locking counter-means comprises a magnetic element, wherein the first magnetic element of the locking means interacts with the second magnetic element of the locking counter-means. The gist of the invention is that a pair of spectacles comprising a spectacle frame and at least one lens which is detachably mounted to the spectacle frame by means of a locking means has a locking counter-means interacting with the locking means, the locking counter-means being disposed on the spectacle frame. Just like the locking counter-means, the locking means, which is displaceable relative to the spectacle frame between a spectacle lens locking position and a spectacle lens unlocking position and which interacts with the lens for the latter to be secured to the spectacle frame in the spectacle lens locking position, is provided with a magnetic element as well. The first magnetic element of the locking element interacts with the second magnetic element of the locking counter-means. The magnetic elements may be magnetic or magnetisable elements. It was found according to the invention that lenses of a pair of spectacles, in particular sports spectacles, are exchangeable particularly easily and quickly if the locking means and the locking counter-means are in each case equipped with interacting magnetic elements. The locking means and the locking counter-means interact to form a locking mechanism in the form of a magnetic slide lock for locking or unlocking at least one lens. Additional locking or fastening means for the lenses can be omitted. A pair of spectacles which comprises two spectacle lenses instead of one spectacle lens that is for instance configured as a protection screen may in principle also be provided with only one locking means and one locking counter-means which interact in such a way as to lock both spectacle lenses. In a preferred embodiment, however, a pair of spectacles comprises two spectacle lenses in which each spectacle lens is allocated to precisely one locking means and one locking counter means. In this embodiment, the spectacles are exchangeable individually.

A pair of spectacles the locking means of which interacts with the spectacle frame in such a way that the at least one spectacle lens is positively locked in the spectacle lens locking position ensures a positive and therefore secure locking of the at least one spectacle lens or of both spectacle lenses. The spectacle lens is preferably clamped between the spectacle frame and the locking means.

A pair of spectacles in which the locking means and the locking counter-means are displaceable relative to each other allows a pair of spectacles to be designed using a small number of components, wherein only one element of the locking mechanism, in other words the locking means or the locking counter-means, needs to be movable. A wearer is able to unlock the spectacle lens by slightly pulling the locking means outward, i.e. from the spectacle lens in the direction of the temple of the spectacles. The spectacle lens is thus easily exchangeable.

A pair of spectacles in which the locking counter-means is rigidly arranged on the spectacle frame provides a very simple solution for detachably locking spectacle lenses. The rigid arrangement of the locking counter means on the spectacle frame may for instance be achieved by an adhesive, clamping or locking connection. The locking counter-means is advantageously inserted in a recess of the spectacle frame and connected to the spectacle frame via an adhesive connection. The locking counter-means is preferably configured as a magnetic element. Alternatively it is conceivable for the locking counter means to comprise a support element which supports the second magnetic element.

A pair of spectacles the first magnetic element of which overlaps with the second magnetic element at least partly in a locking overlap region when in the spectacle lens locking position allows the magnetic elements of the locking means and the locking counter-means to mutually attract each other. The mutual attraction between the magnetic elements is sufficient for the locking means to be secured to the spectacle frame only by magnetic force without requiring any other additional means. Each of the magnetic elements preferably contains a ferromagnetic material, in particular an element from the group comprising iron, nickel and cobalt. Under normal conditions, these elements allow high magnetic retaining forces to be achieved.

A pair of spectacles the first magnetic element of which overlaps with the second magnetic element in a remaining overlap region when in the spectacle lens unlocking position ensures that the locking element is securely retained in the spectacle frame even in the spectacle lens unlocking position. When the magnetic elements overlap, the magnetic interaction between the magnetic elements in the remaining overlap region is sufficient for the locking means to be secured to the spectacle frame without any additional means. The area of the remaining overlap region amounts to at least 30%, particularly at least 40% and preferably at least 60% of the area of the locking overlap region. Furthermore, the area of the remaining overlap region in particular amounts to no more than 70%, particularly no more than 55%, and preferably no more than 40% of the locking overlap region. A suitable value for the area of the remaining overlap region amounts to approximately 50% of the area of the locking overlap region. The remaining overlap region may however be configured in such a way that the magnetic elements overlap only in the region of their outer edges.

A pair of spectacles in which the second magnetic element exerts a restoring force on the first magnetic element in the spectacle lens unlocking position ensures that the locking means automatically reverts back to the spectacle lens locking position after replacement of the spectacle lens. Having replaced the spectacle lens, the wearer may let go of the locking means, causing the locking means to revert back to the spectacle lens locking position as a result of the restoring force exerted on the first magnetic element by the second magnetic element. Having inserted the new spectacle lens, the wearer may let go of the locking means, causing the spectacle lens to be automatically locked by the locking means.

A pair of spectacles in which the interaction between the first magnetic element and the second magnetic element is such that the locking means is held in the spectacle lens locking position or reverts back to the spectacle lens locking position without requiring an external force provides a particularly simple locking mechanism for the spectacle lens that is easy to operate by a wearer.

A pair of spectacles in which a linear movement of the locking means is guided along a direction of displacement via spectacle-frame guide means ensures that the locking means is rigidly and securely retained in the spectacle frame by means of the first magnetic element as a result of the magnetic interaction between the first magnetic element and the second magnetic element. Each of the magnetic elements has a diameter which substantially corresponds to a diameter of the locking overlap region. Preferably, a diameter of the remaining overlap region furthermore corresponds to substantially approximately half of the diameter of the magnetic elements.

A pair of spectacles in which a linear movement of the locking means is guided along a direction of displacement via spectacle-frame guide means provides an even more improved rigid connection between the locking means and the spectacle frame as well as a stable guidance of the locking means when displaced between the spectacle lens locking position and the spectacle lens unlocking position.

A pair of spectacles in which the locking means is secured to the spectacle frame by means of a snap-in connection, wherein the snap-in connection allows a linear movement of the locking means along a direction of displacement, ensures that the locking means is securely retained and guided in the spectacle frame by means of a simple snap-in locking connection. The snap-in locking connection allows a linear movement of the locking means in a direction of displacement while at the same time preventing the locking element from being undesirably unlocked from the spectacle frame.

A pair of spectacles in which two spectacle lenses are provided and each spectacle lens is allocated to in each case one locking means and one locking counter-means allows spectacle lenses in a spectacle frame to be exchanged separately. This is particularly important if only one of two spectacle lenses needs to be replaced, for instance if the spectacle lens is damaged. In this case, the undamaged spectacle lens may remain in the spectacle frame.

A pair of spectacles the spectacle frame of which comprises one spectacle-frame central part and two temples, wherein one locking means is in each case arranged on either side of the spectacle-frame central part in the region of a transition of the spectacle-frame central part towards a temple allows the wearer to easily grasp the locking means.

The following is a description of an exemplary embodiment of the invention in conjunction with the attached drawing.

BRIEF DESCRIPTION OF THE DRAWING

FIG. 5 is an isolated front view of an alternative embodiment of a locking means;

FIG. 6 is a view of the locking means according to FIG. 5, seen from viewing direction VI in FIG. 5;

FIG. 7 is a view, similar to FIG. 3, of a spectacle frame according to the alternative embodiment, with the locking means being omitted for the sake of clarity; and FIG. 8 is a sectional view of the spectacle frame according to section line VIII-VIII in FIG. 7, with the locking means (indicated by dashed lines) according to FIG. 5 and FIG. 6 being shown in a spectacle lens unlocking position.

Mutually corresponding parts are designated by the same reference numerals throughout FIG. 1 to FIG. 8. Details of the embodiments, which are explained in more detail below, may be individual inventions or form part of an inventive concept.

DESCRIPTION OF PREFERRED EMBODIMENTS

Figure 1:
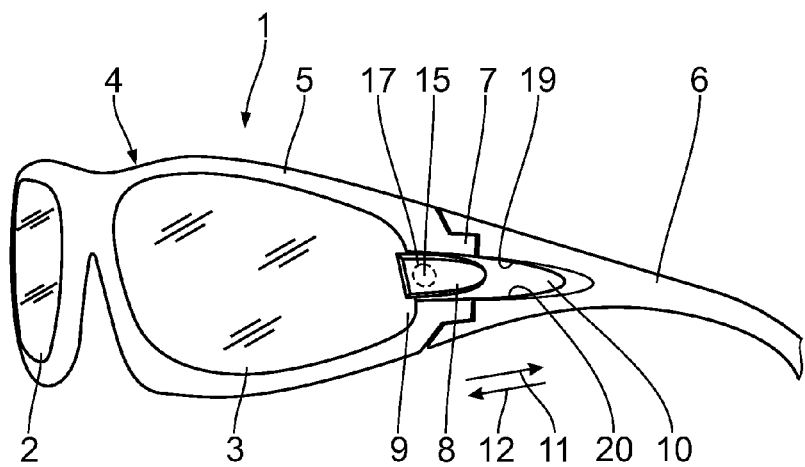
FIG. 1 is a perspective view of a pair of spectacles, wherein a locking means is in a spectacle lens locking position.

FIGS. 1 to 4 show a preferred embodiment of a pair of spectacles 1 comprising exchangeable spectacle lenses 2, 3. The pair of spectacles 1 is preferably a pair of sports or casual spectacles. The pair of spectacles 1 comprises a spectacle frame 4 having a spectacle-frame central part 5 and two temples 6 only one of which is visible in the drawing. The temples 6 are pivotally connected to the spectacle-frame central part in a known manner via hinges 7.

Figure 2:
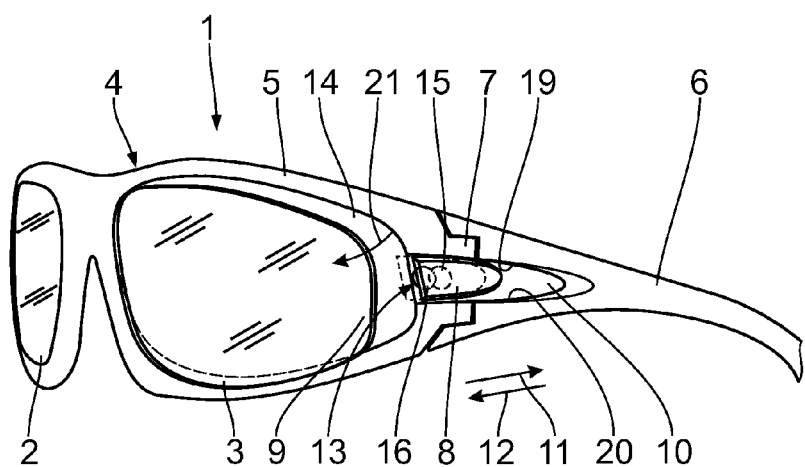
FIG. 2 is a perspective view, similar to FIG. 1, of the pair of spectacles with the locking means in a spectacle lens unlocking position.
Figure 3:
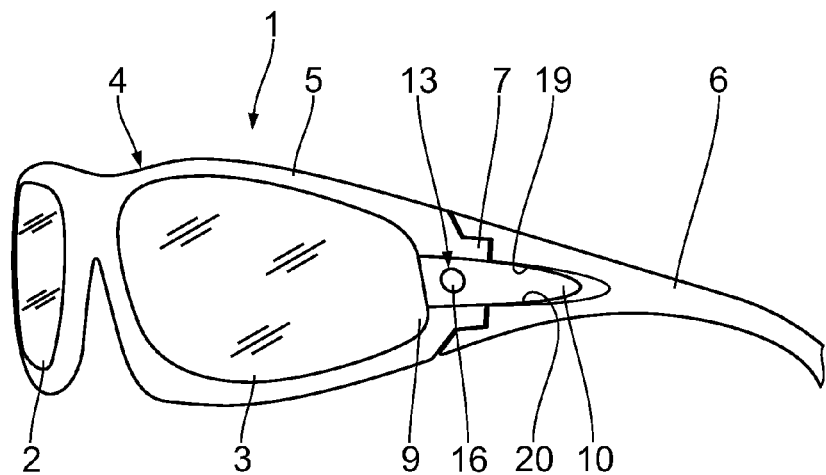
FIG. 3 shows the pair of spectacles according to FIG. 1 and FIG. 2, with the locking means being omitted for the sake of clarity.

The spectacle lenses 2, 3 are detachably locked by the spectacle-frame central part 5. In order for the spectacle lenses 2, 3 to be secured to the spectacle-frame central part 5, the pair of spectacles 1 is provided with a locking means 8 for each spectacle lens 2, 3. The locking means 8 are arranged on the sides of the spectacle-frame central part 5 in the region of a transition of the spectacle-frame central part 5 in the direction of a respective temple 6. FIGS. 1 to 3 show in each case only one locking means 8. The locking means 8 are in each case displaceable relative to the spectacle frame 4 between a spectacle lens locking position shown in FIG. 1 and a spectacle lens unlocking position shown in FIG. 2. In the spectacle lens locking position, the locking means 8 interact with in each case one spectacle lens 2, 3 for the spectacle lenses 2, 3 to be secured to the spectacle-frame central part 5.

In the spectacle lens locking position according to FIG. 1, the locking means 8 partly protrudes from the spectacle-frame central part 5 beyond the spectacle lenses 2, 3 inserted in the spectacle-frame central part 5 so that the spectacle lenses 2, 3 are positively locked in the spectacle lens locking position shown in FIG. 1 by interaction of a groove (not shown) in the spectacle-frame central part 5 with the protruding portion of the locking means 8. As shown in FIG. 1, the locking means 8 engage with each of the spectacle lenses 2, 3 in the region of a lateral end portion 9 of the spectacle lenses 2, 3 extending in an area adjacent to the temples 6.

In the spectacle lens unlocking position shown in FIG. 2, the spectacle lenses 2, 3 are in each case detached from the locking means 8 in such a way that the spectacle lenses 2, 3 are removable from the spectacle frame 4. In the spectacle lens unlocking position, the locking means 8 is displaced relative to the spectacle lens locking position in such a way that the locking means 8 does not protrude beyond the respective spectacle lens 2, 3. The clearance required for displacing the locking means 8 from the spectacle lens locking position into the spectacle lens unlocking position is preferably provided by a recess 10 in the temples 6. The displacement of the locking means 8 from the spectacle lens locking position into the spectacle lens unlocking position is shown in FIGS. 1 and 2 by a directional arrow 11 while the displacement of the locking means 8 from the spectacle lens unlocking position into the spectacle lens locking position is shown by a directional arrow 12. The directional arrows 11, 12 are graphic representations of displacement directions of the locking means 8. The spectacle lens locking position of the locking means 8 is shown in FIG. 2 as well (shown dashed) so as to illustrate an upward displacement movement thereof.

Each of the locking means 8 interacts with a locking counter means 13 allowing the spectacle lenses 2, 3 to be positively locked or unlocked, respectively. The locking means 8 and the locking counter means 13 interact to form a locking mechanism. The locking counter means 13 are arranged on both sides of the spectacle-frame central part 5 in a region between a spectacle lens recess 14 or the spectacle lens 2, 3, respectively, and the temples 6, in other words they are arranged in the region of transition between the spectacle-frame central part 5 and the respective temple 6 just like the locking means 8.

Interaction between the locking means 8 and the locking counter means 13 is the same in both regions on both sides of the spectacle-frame central part 5. Therefore, the following is a detailed exemplary description of the interaction between the locking means 8 and the locking counter means 13 in the region between the second spectacle lens 3 and the temple 6.

Each of the locking means 8 and the locking counter means 13 is provided with a magnetic element 15, 16, wherein the first magnetic element 15 of the locking means 8 interacts with the second magnetic element 16 of the locking counter means 13. The locking counter means 13 is particularly well illustrated in FIG. 3 as the locking means 8 is omitted in FIG. 3 for the sake of clarity. As shown in exemplary embodiment of the pair of spectacles 1 according to FIG. 3, the locking counter means 13 is in the form of a magnetic element 16 itself. Alternatively it is conceivable for the locking counter means 13 to be provided with a support element on which the magnetic element 16 is arranged.

The first magnetic element 15 is preferably arranged on an inner side of the locking means 8 facing the spectacle frame 5. The first magnetic element 15 of the locking means 8 is therefore only shown by dashed lines in FIGS. 1 and 2 as it would not be visible to an observer looking at the exemplary embodiment as shown FIG. 1 and FIG. 2. In the shown exemplary embodiment, the first magnetic element 15 is arranged in a recess formed in the inner side of the locking means 8 facing the spectacle-frame central part 5 and is in particular glued or rigidly inserted into said recess in any other suitable way. Alternatively it is conceivable for the first magnetic element 15 to completely pass through the locking means 8. In this case, it would be necessary for the locking means 8 to be provided with a breakthrough allowing the first magnetic element 15 to be positively inserted therein.

The locking counter means 13 is preferably arranged in a recess of the spectacle-frame central part 5 and is glued to the spectacle-frame central part 5. Alternatively it is conceivable to arrange the locking counter means 13 in the form of the magnetic element 16 in the recess of the spectacle-frame central part 5 in such a way that a positive fit is formed, allowing an adhesive connection to be dispensed with.

The locking means 8 and the locking counter means 13 are displaceable relative to each other, wherein the locking counter means 13 is rigidly connected to the spectacle-frame central part 5 of the spectacle frame 4. The interacting magnetic elements 15, 16 are preferably circular. The magnetic elements 15, 16 are shown in an enlarged view according to FIG. 4, wherein the first magnetic element 15 is shown dashed in FIG. 4. Each of the magnetic elements 15, 16 contains a ferromagnetic material, preferably iron, nickel or cobalt, allowing a magnetic interaction to be achieved. The mentioned elements show particularly good ferromagnetic properties at ambient temperature. Preferably, one of the magnetic elements 15, 16 is a permanent magnet. In order for a magnetic interaction to be achieved between the magnetic elements 15, 16, it must be ensured that the other one of the magnetic elements 15, 16 is not magnetized.

In the spectacle lens locking position shown in FIG. 1, the first magnetic element 15 overlaps with the second magnetic element 16 in a locking overlap region 17. In the shown exemplary embodiment, the first magnetic element 15 completely overlaps with the second magnetic element 16 in the spectacle lens locking position. Seen from the perspective of a person looking at FIG. 1, the magnetic elements 15, 16 are in line with each other. Alternatively, a partial overlap is conceivable in the spectacle lens locking position as well. In this alternative embodiment, the magnetic elements 15, 16 need to be selected in such a way that a higher magnetic force is provided.

In the embodiment according to FIGS. 1 to 4, a diameter $d_1$ or $d_2$, respectively, of the circular magnetic elements 15, 16 in each case amounts to 8 mm. Other dimensions are conceivable as well. A magnetic pull of the magnetic elements 15, 16 needs to be adjusted to the respective magnet diameters $d_1$ and $d_2$. In the spectacle lens unlocking position shown in FIG. 2 and FIG. 4, the first magnetic element 15 overlaps with the second magnetic element 16 in a remaining overlap region 18. A diameter $d_{R\ddot{U}}$ of the remaining overlap region 18 is smaller than a diameter $d_{V\ddot{U}}$ of the locking overlap region 17. The diameter $d_{V\ddot{U}}$ is in particular substantially equal to the extension of the remaining overlap region 18 in the direction in which the locking means 8 and the locking counter means 13 are displaceable relative to one another. Preferably, an area of the remaining overlap region 18 approximately corresponds to half of the area of the locking overlap region 17. In other words, the diameter $d_{R\ddot{U}}$ preferably amounts to half of the diameter $d_1$ of the first magnetic element 15 and of the diameter $d_2$ of the second magnetic element 16. The diameter $d_{V\ddot{U}}$ of the locking overlap region 17 corresponds to the diameters $d_1$ and $d_2$.

Alternatively, when the magnetic interaction between the magnetic elements 15, 16 is sufficient, it is conceivable as well for the magnetic elements 15, 16 to overlap only in an area of their outer edges in the spectacle lens unlocking position so that the edges of the magnetic elements 15, 16 virtually abut against each other in the spectacle lens unlocking position.

In the spectacle lens unlocking position, the second magnetic element 16 of the locking counter means 13 exerts a restoring force on the first magnetic element 15 of the locking means 8. Furthermore, the interaction between the first magnetic element 15 and the second magnetic element 16 is such that the locking means 8 is retained in the spectacle lens locking position or reverts back to the spectacle lens locking position without requiring any external force. The locking means 8 is retained in the locking release position and reverts from the spectacle lens unlocking position back into the spectacle lens locking position only by magnetic interaction between the magnetic elements 15, 16.

The locking means 8 is displaced along the directional arrows 11, 12 extending preferably through outer edges 19, 20 of the recess 10. The outer edges 19, 20 form spectacle-frame guide means. These spectacle-frame guide means 19, 20 provide guidance for a linear movement along the directional arrows 11, 12. An unwanted movement of the locking means 8 in a direction transverse to the directional arrows 11, 12 is effectively prevented by the spectacle-frame guide means 19, 20. The spectacle-frame guide means 19, 20 can also be configured as elevations extending away from the spectacle-frame central part 5.

The displacement path preferably corresponds to the diameter $d_{R\ddot{U}}$ of the remaining overlap region 18. Additionally, the locking means 8 is securely and rigidly retained in the spectacle frame 4 by the magnetic interaction between the magnetic elements 15, 16.

Figure 4:
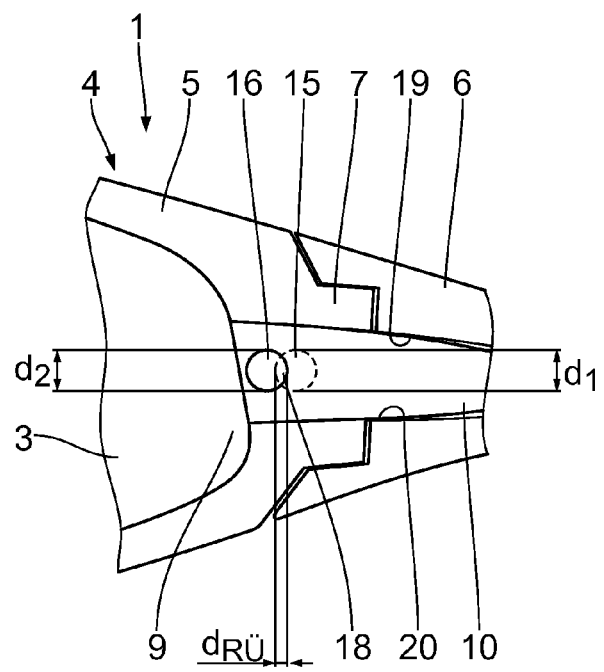
FIG. 4 is an isolated enlarged view of magnetic elements of the locking means and of a locking counter-means.

The following is an exemplary and more detailed description of the exchange of the second spectacle lens 3, wherein particular reference is made to the illustrations according to FIG. 1, FIG. 2 and FIG. 4.

In a first step, the locking means 8 needs to be retracted by the wearer in the direction of the directional arrow 11 from the spectacle lens locking position shown in FIG. 1 into the spectacle lens unlocking position shown in FIG. 2. When this happens, the locking means 8 comprising the first magnetic element 15 overcomes the magnetic pull of the second magnetic element 16 of the locking counter means 13.

In the spectacle lens unlocking position, the locking means 8 initially needs to be held by the wearer. Due to a mounting stress the spectacle lens 3 is subjected to in the spectacle lens locking position, the spectacle lens 3 protrudes from the spectacle lens recess 14 beyond the spectacle-frame central part 5 in an edge area adjacent to the locking means 8, which is shown by the directional arrow 21 in FIG. 2. The wearer is then able to remove the spectacle lens 3 from the spectacle frame 4 and insert another spectacle lens 3 having for example a different tint or an undamaged spectacle lens 3 into the spectacle-frame central part 5 in such a way that said spectacle lens 3 is then in the spectacle lens unlocking position according to FIG. 2.

Afterwards, the wearer needs to press the edge area of the newly inserted spectacle lens 3 adjacent to the locking means 8 in the direction of the spectacle-frame central part 5 until the spectacle lens 3 completely abuts against the spectacle-frame central part 5. In this position of the spectacle lens 3, the wearer lets go of the locking means 8, causing the locking means 8 to be automatically moved from the spectacle lens unlocking position into the spectacle lens locking position due to the magnetic restoring force between the magnetic elements 15, 16 without requiring any external force. This movement is shown by the directional arrow 12 in FIG. 1 and FIG. 2.

If necessary, the first spectacle lens 2 is replaced in the same manner as described above with reference to the second spectacle lens 3.

FIG. 5 to FIG. 8 show a second embodiment of a pair of spectacles 22 comprising a second embodiment of a locking means 23 according to FIG. 5 and FIG. 6 and a second embodiment of a locking counter-means 24 according to FIG. 7. Components which correspond to those as described above with reference to FIG. 1 to FIG. 4 are designated by the same reference numerals and are not discussed in detail again.

The pair of spectacles 22 differs from the pair of spectacles 1 in the design of the locking means 23 and of the locking counter-means 24. According to the second embodiment of the pair of spectacles 22, the locking means 23 is connectable to the spectacle-frame central part 5 of the spectacle frame 4 by means of a snap-in locking connection.

FIGS. 5 and 6 each show an isolated view of the locking means 23. A base body 25 of the locking means 23 corresponds to a base body of the first embodiment of the locking means 8 according to FIG. 1 and FIG. 2. The base body 25 is provided with snap-in means 26, 27 which protrude from the locking means 23 in the direction of the spectacle frame 4 and engage into a corresponding snap-in recess 28 of the spectacle-frame central part 5.

The snap-in means 26, 27 are arranged on a plane surface 30 of the base body 25 facing the spectacle frame 4. Each of the snap-in means 26, 27 comprises a web portion 31 which in each case protrudes from the surface 30 in a direction perpendicular thereto and has a longitudinal extension in the direction perpendicular to the surface 30. Nose-like snap-in protrusions 32 are in each case provided in edge areas of the web portions 31 facing away from the surface 30. The web portions 31 are preferably made of a flexible material, advantageously plastic. This allows the web portions 31 to be bent by a force acting in a direction transverse to their longitudinal extension.

As in particular shown in FIG. 6, the snap-in means 26, 27 are arranged on the surface 30 at a distance from the first magnetic element 15. The magnetic element 15 is inserted, preferably glued into a recess 33 of the locking means 23.

As in particular shown in FIG. 7, the locking counter-means 24 comprises not only the second magnetic element 16 but also the snap-in recess 28. The snap-in recess 28 is adapted to the dimensions of the snap-in means 26, 27 and is provided with a web-like slot 34 which extends in the spectacle-frame central part 5 along the directional arrows 11, 12 of the displacement movement. Facing away from the locking means 23, the web-like slot 34 is adjoined by two spacedapart snap-in grooves 35. A contour of the snap-in grooves 35 is adapted to an outer contour of the snap-in protrusions 32.

FIG. 8 is a sectional view of the locking counter-means 24 according to section line VIII-VIII in FIG. 7. In contrast to FIG. 7, FIG. 8 however also shows the locking means 23 in the spectacle lens unlocking position, with the locking means 23 being shown dashed. According to FIG. 8, the snap-in means 26, 27, of which only the second snap-in means 27 is shown in FIG. 8, engage into the web-like slot 34 and the snap-in grooves 35.

When the locking means 23 is mounted to the spectacle-frame central part 5, the locking means 23 needs to be inserted into the snap-in recess 28 in such a way that the snap-in means 26, 27 go in first. When the locking means 23 is inserted into the snap-in recess 28, the web portions 31 are initially bent slightly towards each other due to the contact with lateral outer walls of the snap-in recess 28. In the inserted position of the locking means 23 according to FIG. 8, the web portions 31 snap apart, causing the snap-in protrusions 32 to reach under the web-like slot 34 in the region of the snap-in grooves 35. This engagement prevents an unwanted release of the locking means 23 from the spectacle frame 4. A movement of the locking means 23 relative to the spectacle-frame central part 5 along the directional arrows 11, 12 is still possible. It must however be ensured that the dimensions of the snap-in means 26, 27 are accordingly adapted to those of the snap-in recess 28. To this end, the snap-in recess 28 has a greater longitudinal extension along the directional arrows 11, 12 than the snap-in means 26, 27. A difference between the longitudinal extension of the snap-in means 26, 27 and the snap-in recess 28 corresponds to a displacement path $d_{SW}$ of the locking means 23.

A linear movement of the locking means 23 is guided by the snap-in connection described above along the directional arrows 11, 12. An unwanted movement of the locking means 23 in a direction transverse to the directional arrows 11, 12 is effectively prevented by the snap-in connection. In analogy to the first embodiment, the second magnetic element 16 exerts a restoring force on the first magnetic element 15 of the locking means 23 in the spectacle lens unlocking position.

In the alternative embodiment according to FIG. 5 to FIG. 8, guide means on the spectacle frame in the form of the outer edges 19, 20 can be omitted since the locking means 23 according to the embodiment shown in FIG. 5 to FIG. 8 is retained in the spectacle frame by the magnetic interaction of the magnetic elements 15, 16 on the one hand and by the snap-in connection on the other.

What is claimed is:

1. Spectacles, comprising
   a) a spectacle frame (4);
   b) at least one spectacle lens (2, 3) which is detachably locked by the spectacle frame (4);
   c) a locking means (8; 23) for securing the spectacle lens (2, 3) to the spectacle frame (4), wherein the locking means (8; 23)
      is displaceable relative of the spectacle frame (4) between a spectacle lens locking position and a spectacle lens unlocking position;
      interacts with the spectacle lens (2, 3) in the spectacle lens locking position and retains the spectacle lens (2, 3) in the spectacle frame (4); and
      unlocks the spectacle lens (2, 3) in the spectacle lens unlocking position in such a way that the spectacle lens (2, 3) is removable from the spectacle frame (4); and
   d) a locking counter-means (13; 24) interacting with the locking means (8; 23), wherein the locking counter means (13; 24) is arranged on the spectacle frame (4), wherein
   e) each of the locking means (8; 23) and the locking counter-means (13; 24) comprises a magnetic element (15, 16), wherein the first magnetic element (15) of the locking means (8; 23) interacts with the second magnetic element (16) of the locking counter-means (13), and
   f) in the spectacle lens unlocking position, the first magnetic element (15) overlaps with the second magnetic element (16) in a remaining overlap region (18).

2. Spectacles according to claim 1, wherein said spectacles is a pair of sports spectacles.

3. Spectacles according to claim 1, wherein in the spectacle lens locking position, the locking means (8, 23) interacts with the spectacle frame (4) in such a way that the at least one spectacle lens (2, 3) is positively locked.

4. Spectacles according to claim 1, wherein the locking means (8; 23) and the locking counter-means (13; 24) are displaceable relative to each other.

5. Spectacles according to claim 1, wherein the locking counter-means (13; 24) is rigidly arranged on the spectacle frame (4).

6. Spectacles according to claim 1, wherein in the spectacle lens locking position, the first magnetic element (15) overlaps with the second magnetic element (16) at least partly in a locking overlap region (17).

7. Spectacles according to claim 1, wherein in the spectacle lens unlocking position, the second magnetic element (16) exerts a restoring force on the first magnetic element (15).

8. Spectacles according to claim 1, wherein the interaction between the first magnetic element (15) and the second magnetic element (16) is such that the locking means (8; 23) reverts back to the spectacle lens locking position without requiring an external force.

9. Spectacles according to claim 1, wherein the interaction between the first magnetic element (15) and the second magnetic element (16) is such that the locking means (8; 23) is held in the spectacle lens locking position without requiring an external force.

10. Spectacles according to claim 1, wherein the magnetic elements (15, 16) are in each case circular.

11. Spectacles according to claim 1, wherein a linear movement of the locking means (8) is guided along a direction of displacement via spectacle-frame guide means (19, 20).

12. Spectacles according to claim 1, wherein the locking means (23) is secured to the spectacle frame (4) by means of a snap-in connection, wherein the snap-in connection allows a linear movement of the locking means (23) along a direction of displacement.

13. Spectacles according to claim 1, wherein two spectacle lenses (2, 3) are provided and each spectacle lens (2, 3) is allocated to in each case one locking means (8; 23) and one locking counter-means (13).

14. Spectacles according to claim 1, wherein the spectacle frame (4) comprises one spectacle-frame central part (5) and two temples (6), wherein one locking means (8; 23) is in each case arranged on either side of the spectacle-frame central part (5) in the region of a transition of the spectacle-frame central part (5) towards a temple (6).

* * * * *